No. 748,405. PATENTED DEC. 29, 1903.
K. S. MURRAY.
APPARATUS FOR AERATING LIQUIDS.
APPLICATION FILED MAR. 3, 1903.
NO MODEL. 3 SHEETS—SHEET 1.

WITNESSES:
P. W. Wright.
S. C. Connor.

INVENTOR
KENNETH SUTHERLAND MURRAY
BY
Howson and Howson
HIS ATTORNEYS.

No. 748,405. PATENTED DEC. 29, 1903.
K. S. MURRAY.
APPARATUS FOR AERATING LIQUIDS.
APPLICATION FILED MAR. 3, 1903.
NO MODEL. 3 SHEETS—SHEET 3.

WITNESSES:
F. W. Wright.
E. W. Collins.

INVENTOR
KENNETH SUTHERLAND MURRAY
BY
Howson and Howson
HIS ATTORNEYS.

No. 748,405.

Patented December 29, 1903.

UNITED STATES PATENT OFFICE.

KENNETH SUTHERLAND MURRAY, OF WESTMINSTER, ENGLAND.

APPARATUS FOR AERATING LIQUIDS.

SPECIFICATION forming part of Letters Patent No. 748,405, dated December 29, 1903.

Application filed March 3, 1903. Serial No. 146,601. (No model.)

*To all whom it may concern:*

Be it known that I, KENNETH SUTHERLAND MURRAY, consulting engineer, a subject of the King of Great Britain and Ireland, residing at 69 Horseferry road, in the city of Westminster, England, have invented certain new and useful Improved Apparatus for Aerating Liquids, of which the following is a specification.

This invention relates to apparatus whereby water or other liquids are aerated or caused to absorb gas—such, for instance, as the production of aerated water by causing water to absorb carbonic-acid gas. I will presume for facility of description that the apparatus is to be used for causing water to absorb carbonic-acid gas; but it is to be understood that the invention is not limited to this application.

According to this invention the water is forced in a sprayed or atomized condition into a vessel containing gas under the pressure at which its absorption is to be effected, and when the absorption of the gas by the water has taken place the aerated water may be discharged direct or into a vessel from which the surplus gas is snifted and the aerated water drawn off. The pressure by which the water is forced into the first-named vessel may be the pressure of the gas used, or other suitable pressure may be used—such, for instance, as the pressure in a water-supply main—or a mechanical device, such as a pump, may be used to force in the said water.

We will describe with reference to the accompanying drawings an arrangement according to this invention, premising that we do not limit ourselves to the precise details illustrated.

Figure 1:
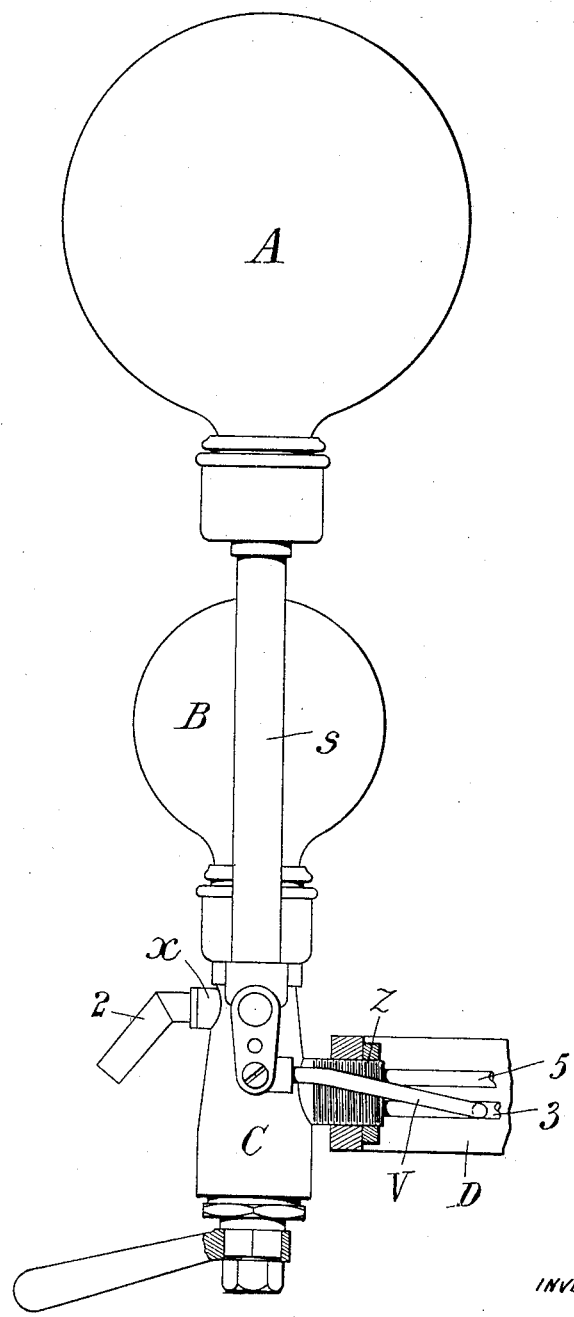
Figure 2:
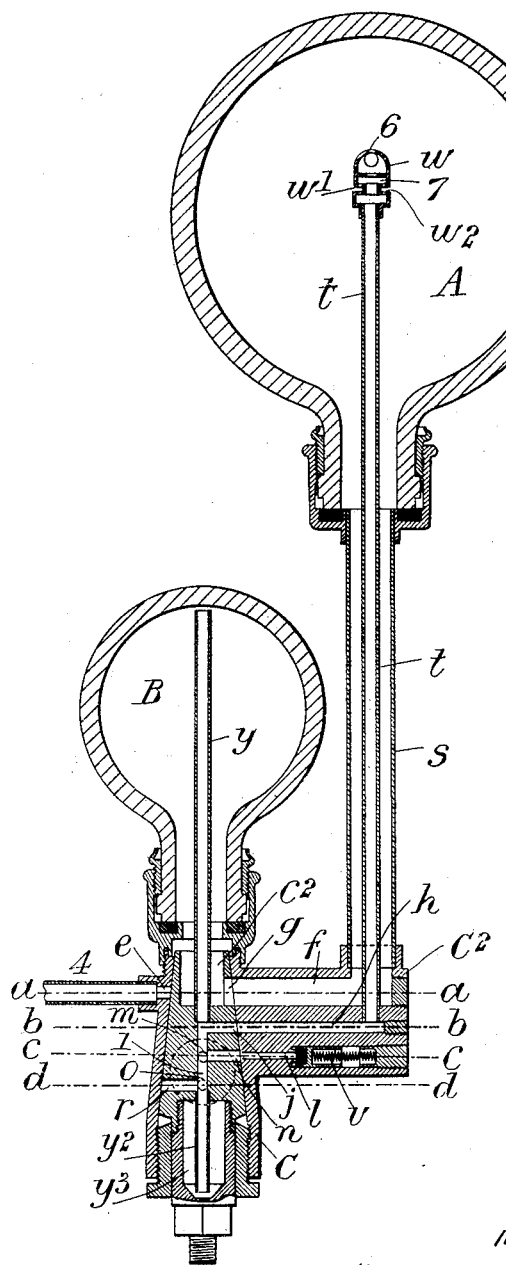
Figure 3:
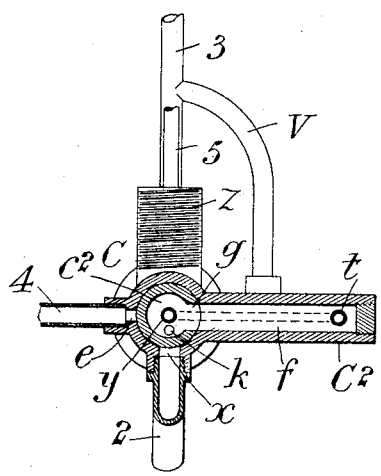
Figure 5:
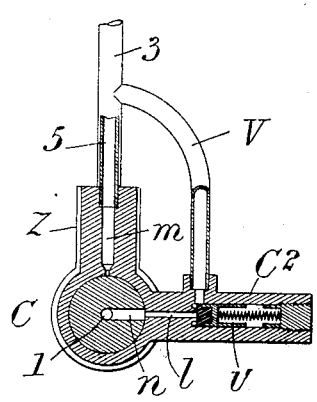
Figure 4:
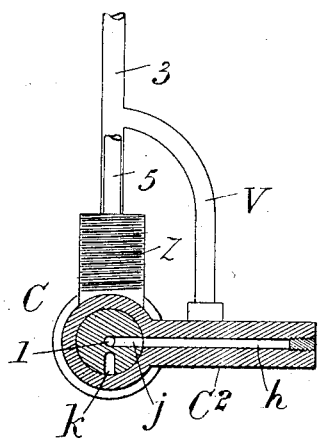

Figure 1 of the drawings is a side elevation of the apparatus; Fig. 2, a vertical section at right angles to Fig. 1; and Figs. 3, 4, 5, and 6 are horizontal sections, respectively, taken on the lines $a$, $b$, $c$, and $d$, Fig. 2.

The apparatus comprises two vessels A and B, the one, A, being larger than and situated above the other, B. At the bottom of the vessel B is fixed a taper plug-valve C, the plug of the valve having a recess $c^2$ at the upper end in direct communication with the bottom of the said small vessel B and the shell of the valve comprising a side extension $C^2$. In the shell of the valve C are lateral passages $e$, $f$, and $x$, and in the plug of the said valve is a lateral passage $g$, these passages being on the line $a$, Fig. 2. On the line $b$, Fig. 2, is a lateral passage $h$ in the shell of the valve and lateral passages $j$ and $k$ in the plug of the valve. On the line $c$, Fig. 2, are lateral passages $l$ and $m$ in the shell of the valve and a lateral passage $n$ in the plug of the valve. On the line $d$, Fig. 2, are lateral passages $p$ and $r$ in the plug of the valve and a lateral passage $o$ in the shell of the valve. The passages $f$, $h$, and $l$ are continued along the extension $C^2$ of the shell or body. $s$ and $t$ are vertical pipes communicating, respectively, with the passages $f$ and $h$ in the extension $C^2$ of the valve. A pressure-release valve $v$ is provided in the passage $l$.

$y$ is a vertical pipe extending from the top of the central passage 1 in the plug of the valve C to near the top of the interior of the vessel B, and $y^2$ is a short vertical pipe extending from the bottom of the central passage 1 in the said plug into a cavity $y^3$ in the lower end of the plug of the valve C, as shown in Fig. 2.

$w$ is a spraying device with a number of openings $w'$ and $w^2$ and fixed to the upper extremity of the pipe $t$, which extends up into the large vessel A. A boss $z$ is formed on the valve shell or body, through which boss the passages $o$ and $m$ extend. This boss can be screwed, and so form a convenient means for attaching the apparatus to a bracket D, as shown in Fig. 1, or to a pipe or other suitable fixture.

In addition to the side connections on the valve-body, already described, by which the vessel A is connected with the vessel B, pipe connections are formed with the passages $e$, $m$, and $o$. A spout 2 is attached to the passage $x$ in the shell of the valve C, and a branch pipe V gives communication between the pressure-release valve $v$ in the outlet $l$ and the pipe 3, leading from the passage $o$ to the atmosphere.

The passage $e$ is in communication, through the pipe 4, with the water-supply, and the passage $m$ is in communication, through the pipe 5, with the gas-supply.

The carbonic-acid-gas supply may be taken from any suitable source, such as cylinders or vessels containing compressed or liquefied carbonic acid. When the vessel contains sufficient gas for more than one operation, the supply may be taken through a reducing-valve, so as to insure a more constant and a lower pressure than would be obtained were the gas taken direct.

Water may be taken from the town-supply mains and need not be under pressure greater than is necessary to allow it to flow by gravity into the vessel B.

When the apparatus is first started, it is desirable to complete an operation or operations in order to obtain the requisite gas-pressure in the vessel A and to wash out the apparatus. Assuming that this has been done, the plug of the valve C is partially rotated, so that its opening $g$ will coincide with the passage $e$ in the shell of the valve, and the passage $p$ in the plug will then coincide with the passage $o$ in the shell of the valve and all the other passages will be closed. Water from any suitable source of supply will now flow through the pipe 4 and passages $e$ and $g$ into the vessel B. As the vessel B gradually fills with water the gas or air will escape therefrom through the pipe $y$, the central passage in the plug of the valve C, and the lateral passages $p$ and $o$. The vessel B being filled with water, the plug of the valve is then turned a further quarter-rotation, so as to cause the passages $k$ and $h$ to coincide, and as the passage $k$ is in communication with the bottom of the vessel B this establishes communication between the lower part of the vessel B and the sprayer $w$ in the vessel A. The passage $n$ will now be in communication with the restricted passage $m$ and the other passages will be closed. Gas under any desired pressure is now admitted from the pipe 5 through the restricted passage $m$, the passage $n$, the central passage 1, and the pipe $y$ into the upper part of the vessel B and forces the water from the said vessel through the passages $k$ and $h$ and the pipe $t$ to the spraying-nozzle $w$ and into the vessel A in a sprayed or atomized condition. This will continue until all the water is discharged from the vessel B into the vessel A or until the pressures in both vessels are equalized. The plug of the valve is then turned another quarter-rotation, thereby bringing it into the position shown in the drawings, the passage $g$ being in communication with the passage $f$, so that the lower parts of the vessels A and B are in communication with each other, the passage $j$ of the plug being in communication with the passage $h$, and therefore the upper parts of the vessels A and B are in communication with each other through the pipes $y$ and $t$, and the passage $n$ being in communication with the passage $l$, in which is the pressure-release valve $v$, all the other passages being closed.

A free passage for gas being provided through the pipes $y$ and $t$, water will gravitate from the vessel A into the vessel B until the vessel B is filled with aerated water. The pressure is at the same time reduced to any desired extent by the gas being discharged through the passage $l$ and the pressure-release valve $v$, the discharged gas escaping through the branch V into the discharge-pipe 3. The plug of the valve is now turned another quarter of a rotation, so as to bring the passage $g$ into communication with the passage to the discharge-spout $x$, and the passage $r$ is brought opposite the passage $o$, so that communication is established between the top of the vessel B and the waste or discharge pipe 3 through the passages $r$ and $o$, the central passage 1 in the plug, and the pipe $y$, all the other passages being closed. The aerated water then passes by gravity from the vessel B through the spout 2, air or other gas being drawn up through the passages $o$ $r$ and the pipe $y$ to replace the water discharged from the vessel B. This completes the cycle of operation, as by another quarter-rotation of the valve-plug a fresh supply of water will be admitted to the vessel B, as hereinbefore described.

Gas at the pressure permitted by the release-valve $v$ (namely, that required for absorption) remains trapped in the vessel A at the end of each cycle of operations. As the gas is used first to discharge water from the vessel B and spray it into the vessel A and afterward, in the third operation of the cycle, the water and gas change vessels, as described, the gas fulfils two duties—first, its pressure is utilized to spray or atomize water into a vessel containing gas under pressure in such a manner that the gas is absorbed by the water, and, secondly, this gas is admitted to the absorbing or mixing vessel to be in its turn absorbed by the following supply of water, and thus the energy contained in compressed carbonic acid as commonly supplied in cylinders or other containers is very economically utilized for the purpose of "aerating" or carbonating liquids.

Aeration of the water can be effected by the apparatus at any desired pressure consistent with safety; but as the normal pressure of compressed or liquefied carbonic-acid gas in cylinders is generally about sixty atmospheres and as the usual pressure employed for aerating liquids is only about six atmospheres it is desirable to employ a pressure-reducing valve between the gas-cylinder and the apparatus. It is necessary to deliver the gas from the cylinder or like container at a pressure in excess of the aeration-pressure (say about two atmospheres above) to enable the water to be forced from the vessel B into the vessel A, which contains gas under the aeration-pressure.

As water absorbs about one volume of carbonic acid for every atmosphere of pressure—if, for example, it be desired to cause an absorption by the water of six volumes of the gas—the pressure-release valve $v$ is adjusted to blow off at a pressure of six atmospheres.

The capacity of the vessel B should be such as to contain the quantity of water to be treated in each cycle of the operation. In the example given eight atmospheres of pressure are required to discharge this water from the vessel B into the vessel A. The water absorbs six times its own volume of gas from the vessel A and occupies space without increasing pressure therein. The vessel B becomes ultimately filled with eight volumes of gas, and when the vessels A and B are put into communication with each other, as described in the third operation of the valve, so that the aerated water flows from the vessel A back into the vessel B, the said water is replaced in the former vessel by six of the eight volumes of gas previously contained in the vessel B. The object of the valve $v$ is to get rid during each operation of the gas in excess of that required for the purpose of spraying or atomizing the water in the vessel A.

The object of restricting the passage $m$ is to prevent a sudden rush of gas into the vessel B and to retard the flow of gas into the vessel A in the interval between when the water has been discharged into the vessel A and when the plug of the valve is turned to its next position.

The perforations $w'$ $w^2$ in the spraying or atomizing nozzle $w$ are arranged in series opposite each other, so that the jets of water issuing from one series of perforations impinge against the water issuing from the other series of perforations and the water is broken into fine spray, in which condition it readily absorbs the gas. 6 is a ball-valve at the top of the nozzle $w$ to facilitate the interchange of gas between the vessels A and B. This ball-valve is held in position on its seat by the water when it is being discharged through the nozzle; but it drops onto a bridge-piece 7 when the pressure is released, thereby giving an enlarged area for the passage of gas. I do not limit myself to this particular form of sprayer or atomizer.

The object of the short pipe extension $y^2$ and the cavity $y^3$ in the bottom of the plug of the valve C is to trap a small volume of gas under pressure during the second and third operations of the valve, so that in the fourth and last operation this gas when the pipe $y$ is opened to the atmosphere (through the passages $r$ and $o$) may be discharged, and thereby clear the passages of water, so as to enable air (or other gas) to be readily drawn in as the water passes from the vessel B through the spout on the passage $x$.

Figure 6:
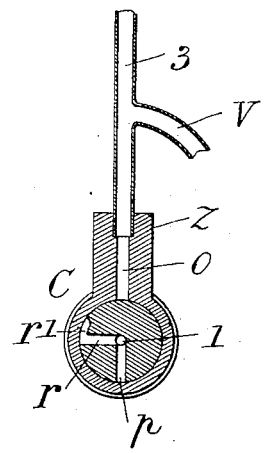

In order to effect silent discharge of the water through the passage $x$ and spout 2, a slight recess may be cut in the surface of the plug, as shown at $r'$, Fig. 6, to give a lead through the opening $r$ and passage $o$, which will release part or all of the gas trapped in the cavity $y^3$ before the passages $g$ and $x$ are brought into communication. Where rapid working is desired, the apparatus may be duplicated, so as to give two discharges for each cycle of operations of the valve. To effect this, the plug-valve C is arranged under the large or mixing vessel A, and two small vessels B are fixed at the same level on opposite sides to branches from the valve-casing similar to the branch shown for the vessel A in connection with the apparatus described, and the openings and passages in the plug and shell of the valve being arranged to suit, so that the cycle of operations will be: The first vessel B draws water from the main supply or other source, (first operation of preceding description,) while the second vessel B interchanges water and gas with the mixing vessel A, (third operation of preceding description.) Then the first vessel B discharges water into the mixing vessel A, (second operation of preceding description,) while the second vessel B discharges water from the spout, (fourth operation of preceding description.) Then the first vessel B interchanges water and gas with the mixing vessel A, (third operation of preceding description,) while the second vessel B draws water from the source of water-supply, (first operation of preceding description.) Then the first vessel B discharges water from the spout, (fourth operation of preceding description,) while the second vessel B discharges water into the mixing vessel A, (second operation of preceding description.)

For portability I may fix the apparatus described and illustrated onto a portable frame. Underneath the apparatus and resting on the frame I attach a water-tank of, say, about a gallon capacity. This water-tank is closed on the top and provided with a release-valve and ready means of filling and emptying. At the back of the frame and behind the tank a pressure-reducing valve is fixed and provision made to receive a small-size cylinder or container of compressed gas. This cylinder or container is connected to the pressure-reducing valve, which latter is connected to the gas-inlet $m$ of the valve C, Figs. 1 and 5. The water-tank is connected to the water-inlet $e$ of the valve C, and the discharged gas through the branch $l$ from the release-valve $v$ of the valve C is conveyed by a pipe connection to the water-tank instead of direct into the atmosphere. Some of this gas is retained above the water in the tank in order to force the water as required into the vessel B through the passages in the valve C during the operation thereof in the cycle of operation already described, and the surplus gas escapes from the water-tank through the aforesaid release-valve on the tank. All the other connections and the method of operation are the same as those hereinbefore described.

Having now particularly described and ascertained the nature of the said invention and in what manner the same is to be performed, I declare that what I claim is—

1. Apparatus for aerating liquids, comprising a charging vessel A, a receiving vessel B, at a lower level than the charging vessel, two separate valve-controlled passages between said vessels, one passage $f$ adapted to communicate between the bottom of said vessels, and the other passage $h$ adapted to communicate between the upper portions of said vessels, in such manner that the gas from the lower will pass to the upper, a valve-controlled liquid-inlet, a valve-controlled gas-inlet, a valve-controlled gas-outlet and a valve-controlled water-outlet to the vessel B, a valve-controlled pressure-discharge common to both vessels, whereby when the vessel A is charged with gas under pressure, first, liquid may be admitted to the vessel B, second, gas may be admitted to the top of the vessel B, to force the liquid therefrom into the vessel A to be there aerated, third, separate communications may be opened with the respective tops and bottoms of the said vessels so that the pressures being equalized water gravitates through one passage from the upper vessel A into the lower vessel B, displacing gas through the other passage from the latter vessel into the former, surplus gas being at the same time discharged from the vessels through the aforementioned pressure-discharge, and fourth, the vessel A being cut off aerated water is discharged by gravity from the vessel B.

2. Apparatus for aerating liquids, comprising a receiving vessel, a charging vessel, a valve and valve-casing, passages between the vessels, a gas-inlet, a water-inlet, a discharge-outlet and a blow-off outlet to the casing, said valve having a groove so arranged that in one position water will be admitted from the liquid-inlet to the receiving vessel, grooves adapted in another position to admit gas to said receiving vessel and to allow liquid from the receiving vessel to be forced into the charging vessel, grooves adapted in another position to allow the water in the charging vessel to return to the receiving vessel and to allow excess gas-pressure to pass out the blow-off outlet and a groove which, in a still further position, is adapted to connect the receiving vessel with the discharge-outlet, substantially as described.

3. Apparatus for aerating liquids, comprising a receiving vessel, a charging vessel, a valve and valve-casing, the casing having a water-inlet and a gas-inlet, a discharge-outlet and a blow-off outlet, the valve having a chamber open at the top and an opening in the side of said chamber adapted to be put into communication with the liquid-inlet, the bottom of the charging vessel or the discharge-outlet, a central opening to the valve and a tube connecting therefrom to the top of the receiving vessel, in combination with a tube in the charging vessel, a branch opening $k$ from the valve-chamber $c^2$ adapted to admit liquid therefrom to the tube of the charging vessel, a branch opening $j$ from the central opening adapted to connect both tubes, and a branch opening $n$ adapted to connect the central opening to the blow-off outlet, substantially as described.

4. An apparatus for aerating liquids, comprising a charging vessel and a receiving vessel of lesser size, a passage connecting them, a second passage connecting the upper portions of said vessels, a valve adapted to control both passages, a gas-inlet, a liquid-inlet and a discharge-outlet to said valve, substantially as described.

5. An apparatus for aerating liquids, comprising a charging vessel and a receiving vessel, a passage connecting them, a second passage connecting the upper portions of said vessels, a valve adapted to control both passages, a gas-inlet, a liquid-inlet and a discharge-outlet to said valve, in combination with a pressure-reducing valve and passage controlled by said valve, substantially as described.

6. An apparatus for aerating liquids, comprising a receiving vessel, a charging vessel of greater size above it, a passage connecting the bottoms of both vessels, a passage connecting both vessels at the top, a valve in said passages to control them, a gas-inlet, a liquid-inlet, and a discharge-outlet also controlled by the valve, substantially as described.

7. Apparatus for aerating liquids, comprising a receiving vessel and a charging vessel at a higher level and passages connecting them, means for admitting liquid to the receiver at normal pressure, means for admitting gas to the receiver to force the liquid therein into the charging vessel which contains gas of less pressure, means for opening communication between the upper parts and also between the lower parts of the two vessels to allow the charged liquid to flow by gravity into the receiver, and means to isolate the charging vessel from the receiver and to then draw off the charged liquid from the receiver, substantially as described.

8. Apparatus for aerating liquids, comprising a receiving vessel and a charging vessel at a higher level, and passages connecting them, means for admitting liquid to the receiver at normal pressure, means for admitting gas to the receiver to force the liquid therein into the charging vessel which contains gas of less pressure, means for opening communication between the upper parts and also between the lower parts of the two vessels to allow the charged liquid to flow by gravity into the receiver, means for reducing the gas-pressure within the vessels, and means to isolate the charging vessel from the receiver and to then draw off the charged liquid from the receiver, substantially as described.

9. Apparatus for aerating liquids, comprising a lower receiving vessel and a higher charging vessel, valve means adapted to cause the liquid to be aerated and discharged in four cycles of operation, a liquid inlet and an outlet to the atmosphere to the receiver, adapted to be open during the first cycle, a gas-inlet passage to the top of the receiver and a passage from the bottom of the receiver to the charging vessel adapted to be opened during the second cycle, a passage connecting the upper parts of the two vessels and a passage connecting the lower parts, adapted to be opened during the third cycle, and a liquid-discharge outlet for the receiver adapted to be opened during the fourth cycle, substantially as described.

10. Apparatus for aerating liquids, comprising a lower receiving vessel and a higher charging vessel, valve means adapted to cause the liquid to be aerated and discharged in four cycles of operation, a liquid inlet and an outlet to the atmosphere to the receiver, adapted to be open during the first cycle, a gas-inlet passage to the top of the receiver and a passage from the bottom of the receiver to the charging vessel adapted to be opened during the second cycle, a passage connecting the upper parts of the two vessels and a passage connecting the lower parts, adapted to be opened during the third cycle, a blow-off adapted to allow the gas-pressure to be relieved, and a liquid-discharge outlet for the receiver adapted to be opened during the fourth cycle, substantially as described.

In testimony whereof I affix my signature in presence of two witnesses.

KENNETH SUTHERLAND MURRAY.

Witnesses:
WILLIAM JOHN WEEKS,
PERCY READ GOLDRING.